(12) United States Patent
Horng et al.

(10) Patent No.: US 7,075,972 B2
(45) Date of Patent: Jul. 11, 2006

(54) INTRA-CELL INTERFERENCE CANCELLATION IN A W-CDMA COMMUNICATIONS NETWORK

(75) Inventors: Jyhchau Horng, Warren, NJ (US); Jinyun Zhang, New Providence, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 753 days.

(21) Appl. No.: 10/223,117

(22) Filed: Aug. 19, 2002

(65) Prior Publication Data

US 2004/0032900 A1 Feb. 19, 2004

(51) Int. Cl.
*H04B 1/69* (2006.01)
(52) U.S. Cl. ...................... 375/148; 375/346
(58) Field of Classification Search ............... 375/140, 375/148, 152, 316, 346, 348, 349, 147; 370/342, 370/315, 320
See application file for complete search history.

(56) References Cited

U.S. PATENT DOCUMENTS

| | | | | |
|---|---|---|---|---|
| 5,394,434 | A * | 2/1995 | Kawabe et al. | 370/342 |
| 6,222,498 | B1 * | 4/2001 | Ishii et al. | 343/853 |
| 6,370,397 | B1 * | 4/2002 | Popovic et al. | 455/561 |
| 6,661,835 | B1 * | 12/2003 | Sugimoto et al. | 375/148 |
| 6,865,218 | B1 * | 3/2005 | Sourour | 375/148 |
| 6,920,173 | B1 * | 7/2005 | Nakamura et al. | 375/148 |
| 2002/0181488 | A1 * | 12/2002 | Okazaki et al. | 370/441 |
| 2003/0002568 | A1 * | 1/2003 | Dabak et al. | 375/148 |
| 2003/0142655 | A1 * | 7/2003 | Higuchi et al. | 370/342 |

OTHER PUBLICATIONS

Kawamura et al., "*Comparison between multipath interference canceller and chip equalizer in HSDPA in multipath channel*," Wireless Research Laboratories, NTT DoCoMo, Inc. Kanagawa, Japan.
"*Multipath interference canceller (MPIC) for HSDPA and effect of 64QAM data modulation*," TSG-RAN Working Group 1, Meeting #18, Boston, USA, 2001.
"*Interference cancellation for HSDPA: an option or a requirement?*," TSG-RAN Working Group 1, Meeting # 21, Turin, Italy, 2001.
Higuchi et al., "*Multipath interference canceller for high-speed packet transmission with adaptive modulation and coding scheme in W-CDMA forward link*," IEEE Journal on selected areas in communications, vol. 20, No. 2, Feb. 2002.

* cited by examiner

*Primary Examiner*—Tesfaldet Bocure
*Assistant Examiner*—Naheed Ejaz
(74) *Attorney, Agent, or Firm*—Dirk Brinkman; Andrew J. Curtin

(57) ABSTRACT

A multi-path interference canceller cancels interference in a signal received by a receiver in a wideband CDMA communications system. A first stage of the canceller has as input the received signal. Each next stage has as input a delayed version of the input of the previous stage. Each stage includes a first channel estimation and interference generation unit for estimating interference in high-speed signal components of the input signal, and a second channel estimation and interference generation unit for estimating interference in low-speed signal components of the input signal. The interference estimated in the previous stage by the first and second channel estimation and interference generation units is then removed from the input signal of the next stage.

5 Claims, 4 Drawing Sheets

INTRA-CELL INTERFERENCE CANCELLATION IN A W-CDMA COMMUNICATIONS NETWORK

FIELD OF THE INVENTION

This invention relates generally to wireless communications, and more particularly to interference cancellation in wideband CDMA channels.

BACKGROUND OF THE INVENTION

High speed down-link packet access (HSDPA) is a key feature in new generations of wireless communications for wideband CDMA (W-CDMA). HSDPA will provide bit rates up to approximately 20 Mbps. This is sufficient for multi-media services. To achieve this high bit rate, multiple HSDPA receivers share a single channel in both time and code domains.

With HSDPA, it is possible to achieve higher bit rates when the receivers include a multi-path interference canceller (MPIC), see Higuchi et al., "*Multipath Interference Canceller for High-Speed Packet Transmission with Adaptive Modulation and Coding Scheme in W-CDMA Forward Link*," Proc. of IEEE VTC2001, May 2001, and NTT DoCoMo, "*Multipath Interference Canceller (MPIC) for HSDPA and Effect of 64QAM Modulation*," 3GPP TSGR1#18(01)010.

Intra-cell interference is due to multiple channelization code spreading and common pilot channel (CPICH) signals in a multi-path fading environment. When the HSDPA signal uses higher order modulation, throughput gains are only attainable in a single path environment, see Panasonic, "*Interference cancellation for HSDPA: an option or a requirement?,*" 3GPP TSGR1#21(01)0905. Therefore, HSDPA receivers should include an MPIC to provide meaningful performance gains.

In addition, there are other sources of interference which degrade performance in multipath fading environments. Typically, the performance of a high-speed down-link shared channel (HS-DSCH) reaches an error floor at 10% of frame error rate (FER) for higher order modulation, when both voice signals and high bit rate data services are supported using code division multiplexing.

In the prior art, MPIC has been done, but only for high bit rate data signals, see Kawamura et al., "*Comparison Between Multipath Interference Canceller and Chip Equalizer in HSDPA in Multipath Channel*," Proc. Of IEEE VTC2002-Spring, May 2002. Canceling high bit rate data signals is relatively simple, because the channelization codes are known.

However, to cancel all interference, voice and low bit rate data signals also need to be considered. This is more difficult, because the chanelization codes for these signals are not known for the HSDPA receivers. Therefore, to increase the system capacity, it is important for HSDPA receiver to cancel all intra-cell interference including voice signals, low bit rate signals, high bit rate data signals, and common pilot channel signals.

SUMMARY OF THE INVENTION

A multi-path interference canceller cancels interference in a signal received by a receiver in a wideband CDMA communications system. A first stage of the canceller has as input the received signal. Each next stage has as input a delayed version of the input of the previous stage.

Each stage includes a first channel estimation and interference generation unit for estimating interference in high-speed signal components of the input signal, and a second channel estimation and interference generation unit for estimating interference in low-speed signal components of the input signal.

The interference estimated in the previous stage by the first and second channel estimation and interference generation units is then removed from the input signal of the next stage.

DETAILED DESCRIPTION OF THE PREFERRED EMBODIMENT

System Structure

Figure 1A:
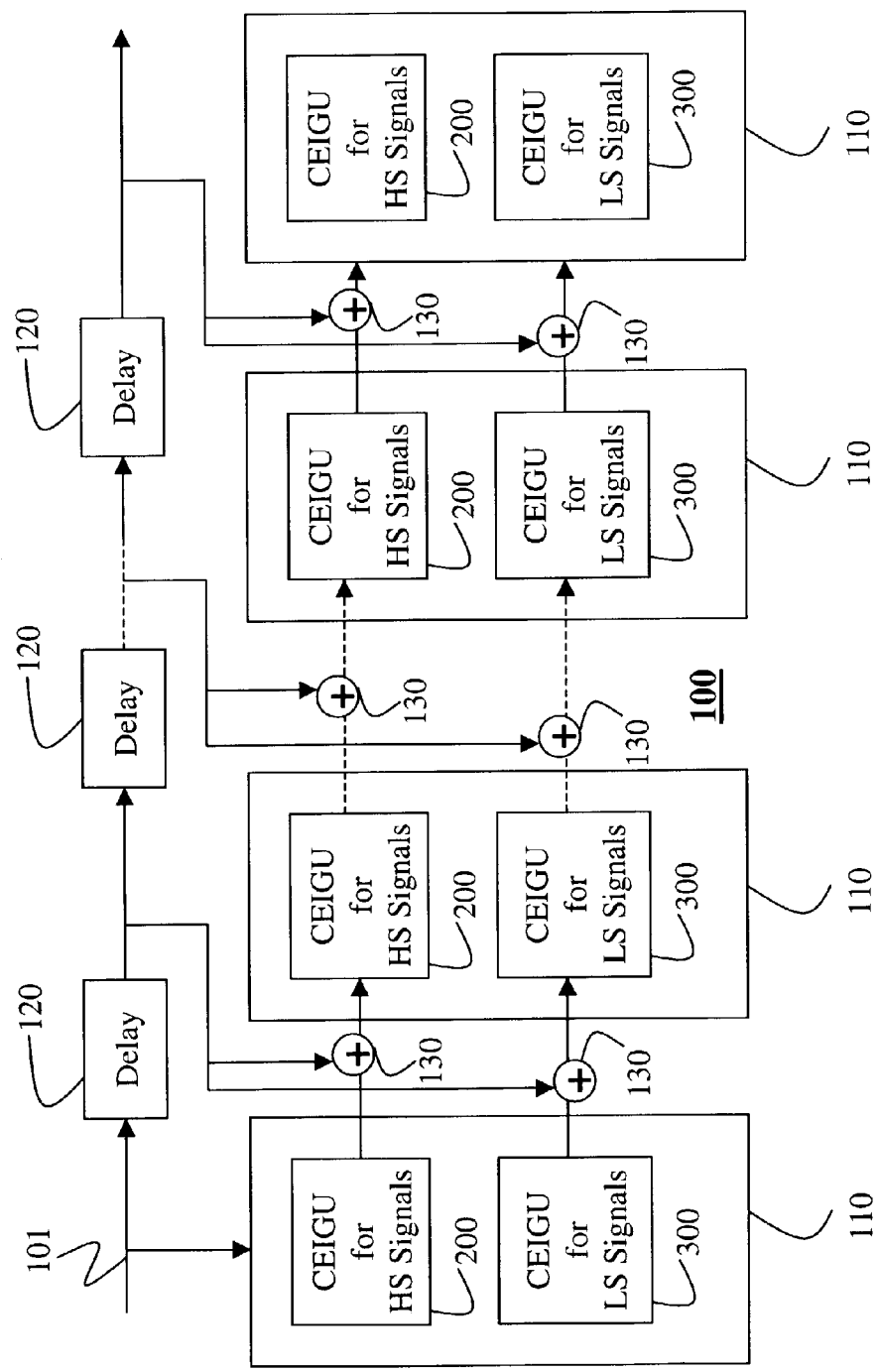
FIG. 1A is a top-level block diagram of an intra-cell interference canceller according to the invention.
Figure 1B:
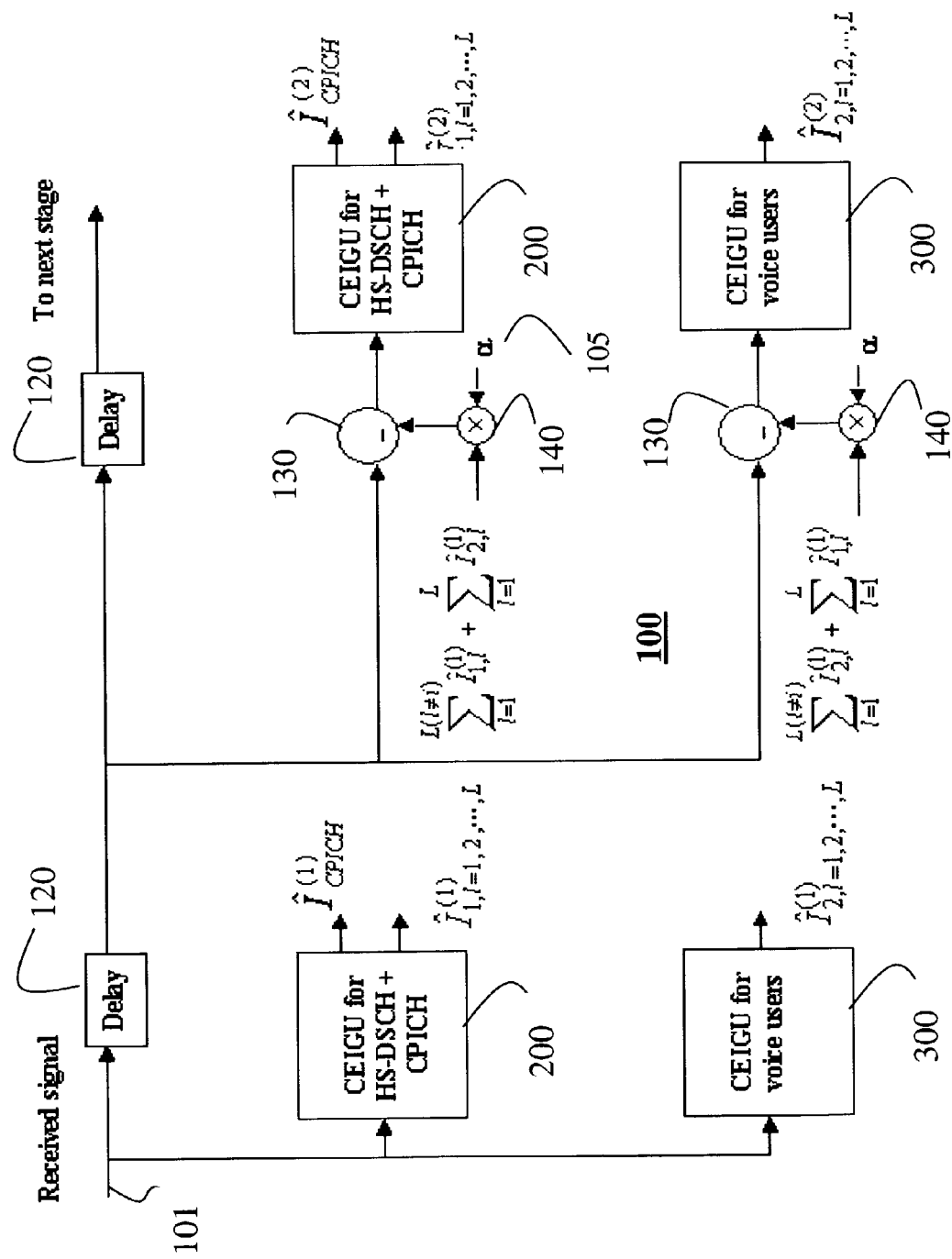
FIG. 1B is a detailed top-level block diagram of an intra-cell interference canceller according to the invention.

FIGS. 1A and 1B show the structure of a multi-path interference canceller (MPIC) 100 for canceling interference in a signal received via a down-link channel of a wideband CDMA communications system according to the invention.

The canceller 100 includes multiple stages 110. A first stage has as input the received signal 101, and each next stage has as input a delayed 120 version of the input of the previous stage. Each stage includes a first channel estimation and interference generation unit (CEIGU) 200 for high bit rate down-link shared channels (HS-DSCH) and channelization code spreading and common pilot channel (CPICH), generally high-speed (HS) signal components of the received signal, and a second channel estimation and interference generation unit 300 for voice signals and low bit rate data signals, generally low-speed (LS) signal components of the received signal. The MPIC 100 also includes delays 120 connecting the stages, adders 130 and multipliers 140.

System Operation

A signal is received on line 101. In each stage 110, multi-path interference estimated in a previous stage by the CEIGUs 200 and 300 is removed from the received signal 101 by the adder 130 to form an input signal for the corresponding CEIGUs 200 and 300 in a next stage.

In HSDPA systems, one packet comprises a three-slot length (2 msec) of a W-CDMA frame. DSCH is realized maximally by 15 code multiplexing, where each code channel consists of 160 coded data symbols. For DSCH and CPICH, the channelization codes are known at the HSDPA receiver with spreading factors of 16 and 256, respectively.

Figure 2:
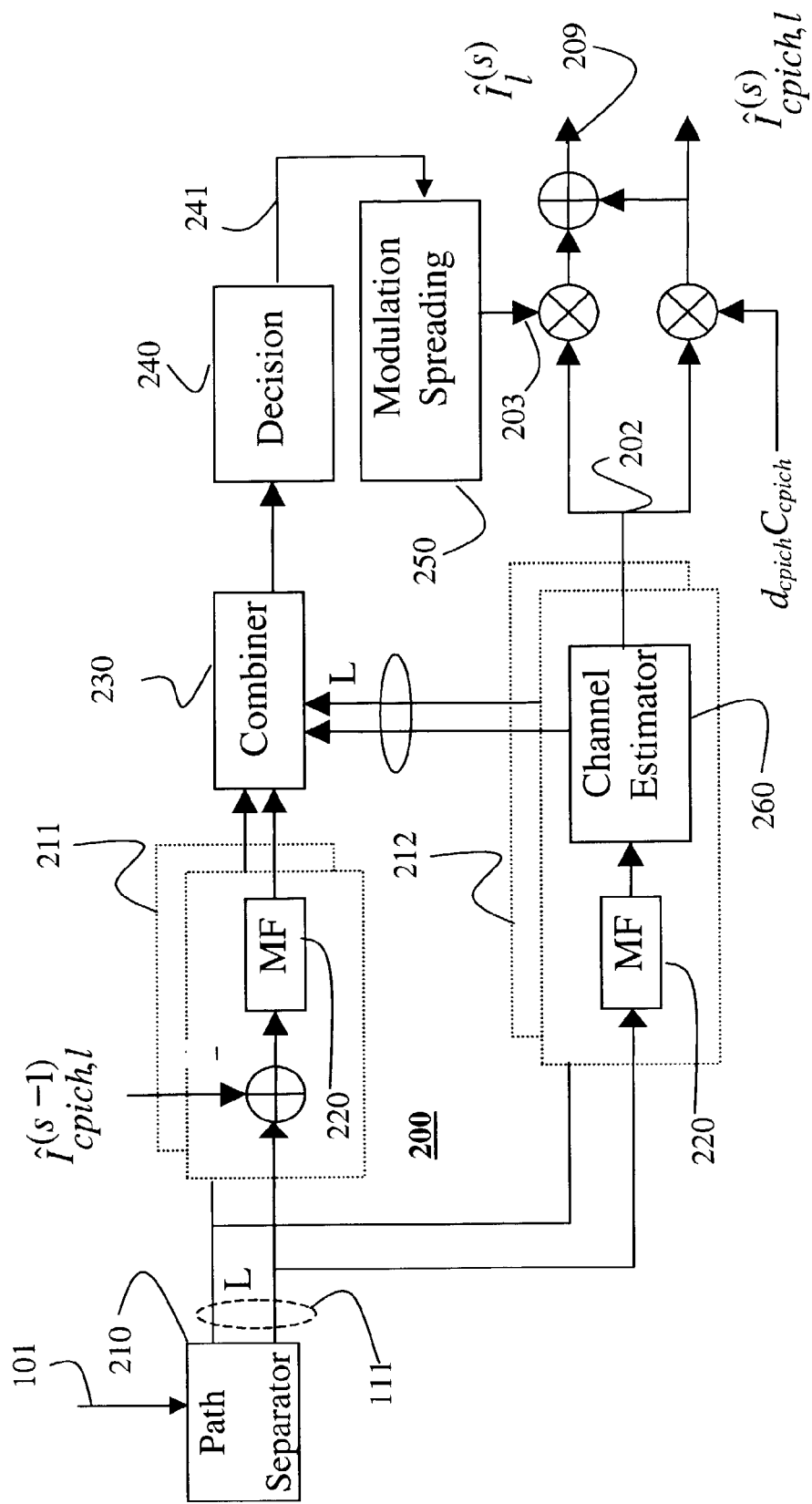
FIG. 2 is a block diagram of a channel estimation and interference generation unit for high bit rate data signals and common pilot channel signals.

FIG. 2 shows the internal structure of the GEIGU 200. The GEIGU includes a path separator 210, first blocks 211 for code channels, and second blocks 212 for common pilot channels. The blocks 211–212 include matched filters 220, and each block 212 also includes a channel estimator 260. In addition, the CEIGU includes a combiner 230, a decision block 240, and a modulation and spreading block 250.

The received signal 101 is fed into the path separator 210 to generate L output signals 111. Each output signal is a copy the received signal with a different time delay determined from the channel impulse responses. The MF 210 matches to the channelization code.

The channel impulse response or gain of each resolved channel path is estimated by correlating the received CPICH signal with predefined pilot symbols over one slot length. The phase variation of each path is then compensated and coherently RAKE combined 230 after the matched filtering 220.

The estimated interference 209 is generated using the output 241 of the estimated channel response 202, and the output 203 of the modulation/spreading block 250.

If $\bar{\xi}_l^{(p)}(t)$ is an estimated complex channel variation and $\tilde{d}_k^{(s)}(t)$ is an estimated data modulation for the $l^{th}$ path ($1 \leq l < L$) of the $k^{th}$ code channel at the $s^{th}$ stage ($1 \leq s \leq N$), then the MPI replica signal of the $s^{th}$ stage is expressed as $$\hat{I}_l^{(s)}(t - \hat{\tau}_l) = \sum_{l=1}^{L} \bar{\xi}_l^{(s)}(t) \left( \sum_{k=1}^{K} \tilde{d}_k^{(s)}(t - \hat{\tau}_l) \cdot c_k(t - \hat{\tau}_l) + d_{cpich}(t - \hat{\tau}_l) \cdot c_{cpich}(t - \hat{\tau}_l) \right)$$

$$= \hat{I}_{0,l}^{(s)} + \hat{I}_{1,l}^{(s)}$$

(1)

where $c_k(t)$ and $c_{cpich}(t)$ are the spreading modulation for the $k^{th}$ code channel and common pilot channel, respectively. The variable $d_{cpich}(t)$ is the known pilot channel modulation, and the variable $\hat{\tau}_l$ is an estimated delay time of the l-th path.

The MPI replica is the sum of the estimated interference from HS-DSCH and CPICH, $\hat{I}_{0,l}^{(s)}$, and interference from voice signals $\hat{I}_{1,l}^{(s)}$.

The total number of channelization codes K in equation (1) is a sum of the number of codes for HSDPA and voice signals. By using $\hat{I}_l^{(s)}(t)$ and the received signal r(t), the input signal $r_l^{(s+1)}(t)$ to the MF for the l-th path at the $(s+1)^{th}$ stage is represented as $$r_l^{(s+1)}(t) = r(t) - \alpha \begin{cases} \sum_{l=1}^{L(l \neq i)} \hat{I}_{1,l}^{(s)}(t - \hat{\tau}_j) + \sum_{l=1}^{L} \hat{I}_{2,l}^{(s)}(t - \hat{\tau}_j) & (2a) \\ \sum_{l=1}^{L} \hat{I}_{1,l}^{(s)}(t - \hat{\tau}_j) + \sum_{l=1}^{L(l \neq i)} \hat{I}_{2,l}^{(s)}(t - \hat{\tau}_j) & (2b) \end{cases}$$

where $\alpha$ 105 of FIG. 1B is a real-valued interference rejection weight and equations (2a) and (2b) are for HS-DSCH CEIGUs 200 and voice CEIGUs 300, respectively.

Because the updated MPI is removed from the received signal, and the channel estimation and tentative data decision are repeatedly performed in each canceling stage, the accuracy of the regenerated MPI replica is improved as the number of stages increases.

Figure 3:
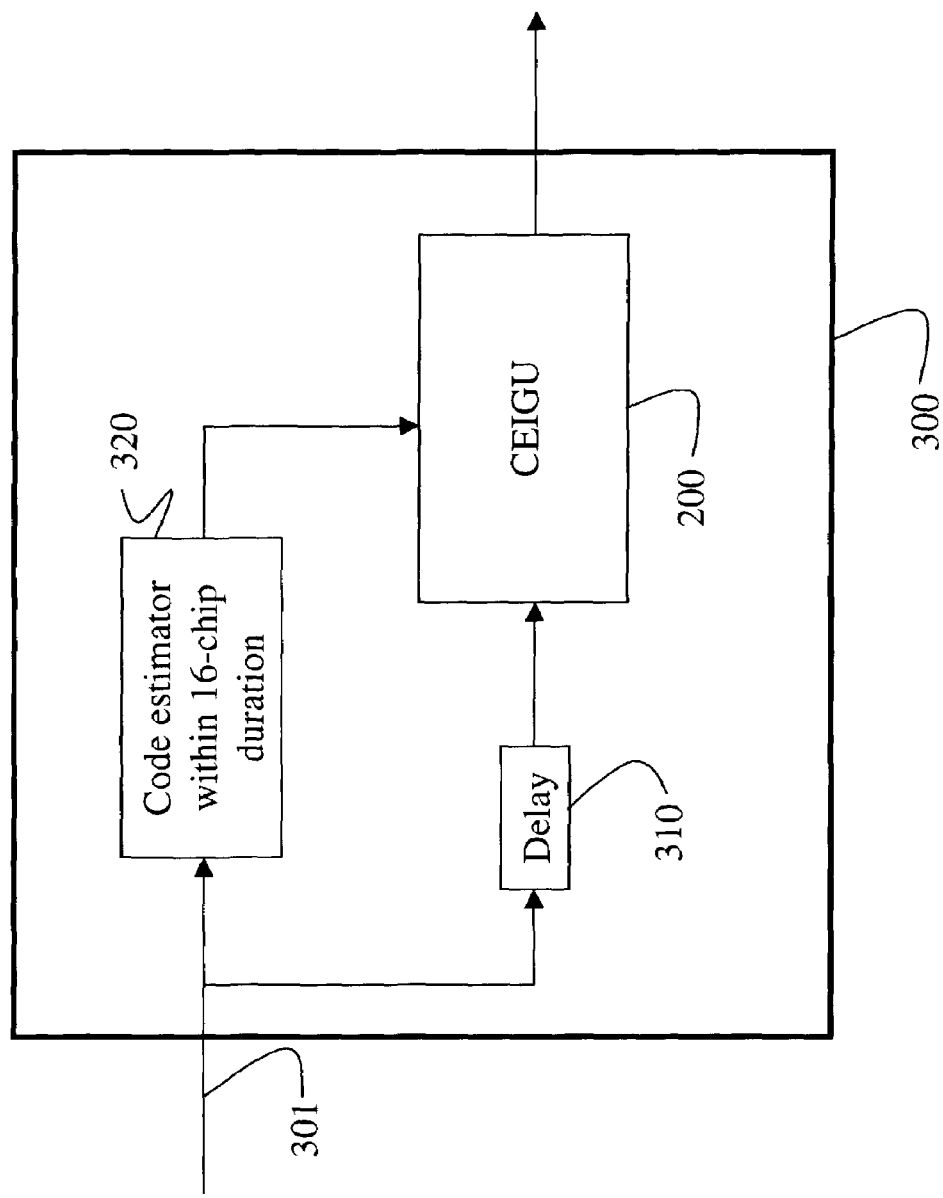
FIG. 3 is a block diagram of a channel estimation and interference generation unit for voice signals and low bit rate data signals.

FIG. 3 shows a CEIGU 300 for a voice and low bit rate signals 301. The CEIGU 300 includes a delay 310, a code estimator block 320, and a GEIGU 200. In the voice signal, the channelization codes are generally longer than 16, and a slower bit rate is used. The bit rate is not known at the HSDPA receiver. In such cases, the receiver can divide the entire channelization code length into several intervals with 16-chip duration for each interval and perform interference cancellation in each interval. In other words, the receiver estimates 310 the channelization codes every 16 chips and performs cancellation within the 16-chip duration.

The estimation of the channelization can be performed with a bank of match filters with 16-chip length to perform partial correlations with the received signal. Because the number of different voice signals is also not available at the receiver, the receiver can select the codes with the likelihood above the predefined correlation threshold, which refers to the energetic codes or strong interference. After the channelization codes for the voice signal are estimated within a 16-chip duration, the receiver can perform apply the CEIGU 200 as described above.

The invention performs multi-path interference cancellation and intra-cell multi-user interference cancellation of a down-link shared channel (DSCH), common pilot channel (CPICH) and MUIs from other intra-cell users.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A multi-path interference canceller for canceling interference in a signal received by a receiver in a wideband CDMA communications system, comprising:
   a plurality of stages including a first stage having as input the received signal, and each next stage having as input a delayed version of the input of the previous stage, each stage further comprising:
   a first channel estimation and interference generation unit for estimating interference in high-speed signal components of the input signal;

a second channel estimation and interference generation unit for estimating interference in low-speed signal components of the input signal; and means for removing the interference estimated in the previous stage by the first and second channel estimation and interference generation units from the input signal of the next stage.

2. The canceller of claim 1 wherein the high-speed signal components of the input signal include signals of high bit rate down-link shared channels, channelization code spreading and common pilot channel signals, and the low-speed signal components of the input signal include voice signals and low bit rate data signals.

3. The canceller of claim 2 wherein the first channel estimation and interference generation unit, further comprising:

a path separator 210, coupled to the input of the stage, producing input for first blocks for the channelization code spreading channels and second blocks for the common pilot channels;

a combiner receiving input from the first and second blocks;

a decision block and a modulation and spreading block serially connected to an output of the combiner; and means for estimating the interference from an output of the modulation and spreading block and outputs of the second blocks.

4. The canceller of claim 1 wherein the second channel estimation and interference generation unit, further comprising:

a code estimator block coupled to the input of the stage;

a delay coupled to the input of the stage; and another first channel estimation and interference generation unit coupled to outputs of the code estimator and the delay.

5. A method for canceling multi-path interference in a signal received by a receiver in a wideband CDMA communications system, comprising:

receiving an input received signal in a first stage of an interference canceller; determining, in each stage, a total interference in the input signal, the determining further comprising:

delaying the received signal for input for each next stage of the canceller;

estimating interference in high-speed signal components of the input signal;

estimating interference in low-speed signal components of the input signal; and removing the total interference estimated in a previous stage from the input signal of the next stage.

* * * * *